(12) United States Patent
Shows

(10) Patent No.: US 8,085,244 B2
(45) Date of Patent: Dec. 27, 2011

(54) METHOD AND APPARATUS FOR DISPLAYING MULTIPLE IMAGES ON INDIVIDUAL KEYS OF A KEYBOARD

(75) Inventor: Thomas Alexander Shows, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 848 days.

(21) Appl. No.: 11/876,434

(22) Filed: Oct. 22, 2007

(65) Prior Publication Data

US 2009/0102797 A1    Apr. 23, 2009

(51) Int. Cl.
  *G09G 5/00*    (2006.01)
(52) U.S. Cl. ........ 345/168; 345/169; 345/175; 345/172; 200/314; 341/21; 341/22; 463/37; 250/221; 250/239
(58) Field of Classification Search .................. 345/156, 345/166, 168–169, 172, 175; 200/314; 341/21, 341/22; 463/37–38; 250/221, 239
See application file for complete search history.

(56) References Cited

U.S. PATENT DOCUMENTS

| | | | |
|---|---|---|---|
| 4,950,898 A * | 8/1990 | Fothergill | 250/390.01 |
| 5,408,060 A * | 4/1995 | Muurinen | 200/314 |
| 5,515,045 A * | 5/1996 | Tak | 341/23 |
| 6,677,931 B2 * | 1/2004 | Chi et al. | 345/170 |
| 6,707,027 B2 * | 3/2004 | Liess et al. | 250/221 |
| 6,805,506 B2 * | 10/2004 | Bar-Yona | 400/485 |
| 6,847,350 B2 * | 1/2005 | Van Brocklin et al. | 345/157 |
| 7,498,560 B2 * | 3/2009 | Hwang et al. | 250/221 |
| 7,523,862 B2 * | 4/2009 | Tracy et al. | 235/454 |
| 7,525,534 B2 * | 4/2009 | Skillman et al. | 345/168 |
| 2004/0201568 A1 * | 10/2004 | Dowd | 345/156 |
| 2007/0080948 A1 * | 4/2007 | Wernersson et al. | 345/169 |

FOREIGN PATENT DOCUMENTS

| | | | |
|---|---|---|---|
| JP | 01232623 | * | 9/1989 |
| JP | 01234920 | * | 9/1989 |
| JP | 04-184823 | * | 7/1992 |
| JP | 10027053 | * | 1/1998 |

* cited by examiner

*Primary Examiner* — Lun-Yi Lao
*Assistant Examiner* — Insa Sadio
(74) *Attorney, Agent, or Firm* — Baker Botts L.L.P.

(57) ABSTRACT

A key for an information handling system, the key including a finger surface configured for interaction with a user's finger and an inverted lenticular lens positioned beneath the finger surface. The finger surface may be substantially transparent to at least one wavelength of visible light. The inverted lenticular lens may include a first image and a second image. Light incident on the lens at a first angle of incidence may project the first image from the lens onto the substantially transparent finger surface of the key and light incident on the lens at a second angle of incidence may project the second image from the lens onto the substantially transparent finger surface of the key.

20 Claims, 4 Drawing Sheets

METHOD AND APPARATUS FOR DISPLAYING MULTIPLE IMAGES ON INDIVIDUAL KEYS OF A KEYBOARD

TECHNICAL FIELD

The present invention is related to information handling systems and, more particularly, methods and apparatus for displaying multiple images on individual keys of a keyboard.

BACKGROUND OF THE INVENTION

As the value and use of information continues to increase, individuals and businesses seek additional ways to process and store information. One option for processing and storing information is an information handling system. An information handling system generally processes, compiles, stores, and/or communicates information or data for business, personal, educational, governmental, or other purposes thereby allowing users to take advantage of the value of the information.

Because technology and information handling needs and requirements vary between different users and/or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

FIG. 1 depicts selected elements of an example prior art information handling system 1. Information handling system 1 includes a host 10, which may include processing resources (e.g., one or more central processing units (CPUs) and storage resources that are accessible to the processing resources). Storage resources may include volatile storage or memory and/or persistent storage, e.g., disk storage, flash memory or other type of erasable read only memory (ROM), and the like. Information handling system 1 may also include various other peripheral or I/O devices known in the field of data processing system design.

Host 10 may include a keyboard 20. As shown in FIG. 2A, a prior art keyboard 20 may include a standardized set of keys (and/or buttons) 22 operable to provide input to host 10. One example of keyboard 20 includes a set of keys 22 arranged in the so-called "QWERTY" character set, which has been used for typewriters. In a standard keyboard 20, keys 22 display one or more imprinted characters, for example, characters corresponding to alphanumeric characters, mathematical functions, and/or specialized function keys.

Some of the individual keys (e.g., 22a and 22b) display two or more characters. In the example shown in FIG. 2A, key 22a displays a numeral one ("1") on a lower portion of the key and an exclamation point ("!") on an upper portion of the key. In this example, key 22a may be used to input a numeral one as its primary character. "Shift" key 22c may be used to select a secondary character (e.g., an exclamation point). Keys 22 may support multiple alternative characters available through use of a key modifier (e.g., "Shift", "Alt", "Ctrl" (or "Control"), "Fn", etc.). Some examples of prior art keyboards may include alternative characters that are not imprinted on the top surface of the keys. The use of imprinted alternative characters may depend on space limits, legibility, and/or a variety of other considerations.

FIG. 2B depicts individual key 22a removed from prior art keyboard 20. As can be seen in FIG. 2B, key 22a may include a top surface 24, sides 26, and a post 28. Top surface 24 is configured to display the characters corresponding to key 22a ("1" and "!") as well as to interact with the user's fingers while typing. Sides 26, in this example, bear no imprint but provide rigidity to key 22a. Post 28 is configured to mate with various features of keyboard 20, e.g., to mount key 22a to keyboard 20.

SUMMARY OF THE INVENTION

The present disclosure describes a method and apparatus for presentation of spatially coincident images independent of viewing angle for use in an information handling system. Although the following discussion focuses on keys and keyboards in the context of personal computers, these teachings may be used in a variety of applications related to information handling systems.

In one embodiment, the present disclosure provides a key for an information handling system. The key may include a finger surface configured for interaction with a user's finger and an inverted lenticular lens positioned beneath the finger surface. The finger surface may be substantially transparent to at least one wavelength of visible light. The inverted lenticular lens may include a first image and a second image. Light incident on the lens at a first angle of incidence may project the first image from the lens onto the substantially transparent finger surface of the key and light incident on the lens at a second angle of incidence may project the second image from the lens onto the substantially transparent finger surface of the key.

In another embodiment, the present disclosure provides a keyboard for an information handling system. The keyboard may include two keys. Each key may include a finger surface configured for interaction with a user's finger and an inverted lenticular lens positioned beneath the finger surface. The finger surface may be substantially transparent to at least one wavelength of visible light. The inverted lenticular lens may include a first image and a second image. Light incident on the lens at a first angle of incidence may project the first image from the lens onto the substantially transparent finger surface of the key and light incident on the lens at a second angle of incidence may project the second image from the lens onto the substantially transparent finger surface of the key.

In another embodiment, the present disclosure provides a method for displaying two or more spatially coincident images on a key associated with an information handling system. The key may include a finger surface and a lenticular lens. The finger surface may be substantially transparent to at least one wavelength of visible light. The method may include illuminating the lenticular lens at a first angle of incidence such that the first image is displayed on the finger surface of the key. The method may include illuminating the lenticular lens at a second angle of incidence such that the second image is displayed on the finger surface of the key.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the invention and its advantages are best understood by reference to FIGS. 3-8 wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For the purposes of this disclosure, computer-readable media may include any instrumentality, or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

The exemplary implementations of information handling systems presented herein may emphasize the context of desktop personal computers; it should be understood, however, that the features described herein may also be appropriate for other classes of information handling systems including, as examples, mobile systems including notebook or lap top systems, hand held systems, and/or interactive displays, etc.

Figure 3:
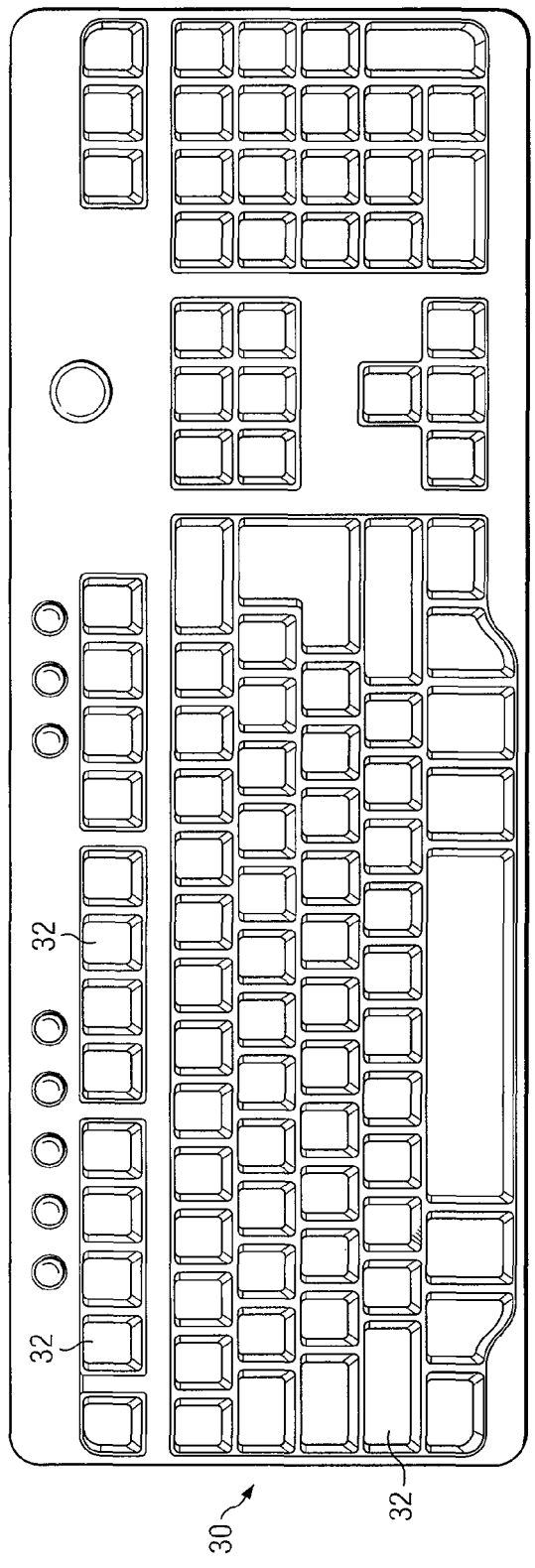
FIG. 3 depicts an embodiment of a keyboard for use with an information handling system incorporating teachings of the present disclosure.

FIG. 3 depicts an embodiment of a keyboard 30 for use with an information handling system (e.g., a system similar to that shown in FIG. 1) incorporating teachings of the present disclosure. Keyboard 30 may include any number of keys 32. For example, keyboard 30 may have the basic configuration of a standard "QWERTY" keyboard. As shown in FIG. 3, however, keyboard 30 may not have imprinted and/or embossed characters on keys 32. Instead, keyboard 30 may be configured to display one or more characters on each key 32 as directed by the user or by the information handling system.

In some embodiments, keyboard 30 may be configured to display different character sets at different times or in different operating modes, which may be controlled by the user or the information handling system. A "character set" may be defined as a set of characters displayed on keys 32 of keyboard 30 at a particular time or in a particular operating mode. "Characters" may include English alphanumeric symbols, foreign language graphemes (e.g., Japanese "kanji", Hebrew alphabet, Chinese characters, Greek alphabet, etc.), numerals, punctuation marks, pictorial symbols, decorative symbols, mathematical functions, glyphs, etc.

For example, keyboard 30 may be configured to display a standard "QWERTY" character set in a first operating mode and a character set corresponding to a foreign alphabet and/or language (e.g., Hebrew, Cyrillic, Japanese, Chinese, etc.) in a second operating mode. As another example, keyboard 30 may be configured to display a U.S.-International character set, a UK-Extended character set, a Dvorak character set, and/or any other character set on keyboard 30. In some embodiments, keyboard 30 may be configured to display one or more character sets that include non-alphanumeric characters that may be useful when operating an information handling system or software executed thereon (e.g., gaming characters or symbols, shortcut commands for use in word processing, etc.).

Figure 4:
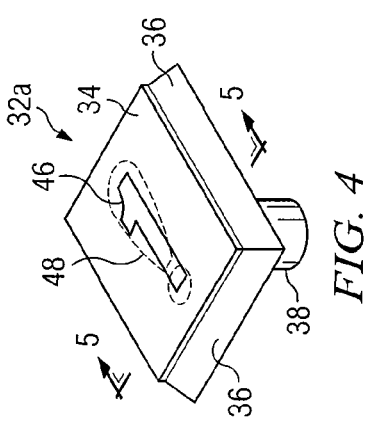
FIG. 4 depicts a key for use with an information handling system incorporating teachings of the present disclosure.

FIG. 4 depicts a key 32a for use with an information handling system incorporating teachings of the present disclosure. Key 32a may include a finger surface 34, four sides 36, and a post 38. Key 32a may be configured to fit in keyboard 30 and to interact with other components of keyboard 30 (e.g., to be retained in keyboard 30, and/or to input a data signal when pressed by a user).

Finger surface 34 may be any feature or component of key 32a configured to interact with a user's finger. For example, finger surface 34 may be convex to help locate a user's finger over the center of key 32a. Finger surface 34 may be transparent to at least one wavelength of visible light. When finger surface 34 is transparent to at least one wavelength of visible light, it may be used as a screen to display an image when illuminated from below with that wavelength of light. For example, if finger surface 34 is transparent to red light, a red image projected from below may be displayed on finger surface 34.

In particular, finger surface 34 may be configured to display two or more different images as projected from below. In some embodiments of the present disclosure, finger surface 34 may be configured to display a first image 46 corresponding to a primary character set and a second image 48 corresponding to a secondary character set. Which image is displayed at any given time may correspond to which character set a user or an information handling system has selected and/or enabled for keyboard 30. In the embodiment shown in FIG. 4, first image 46 corresponds to the numeral one ("1") and second image 48 corresponds to an exclamation point ("!").

Figure 1:
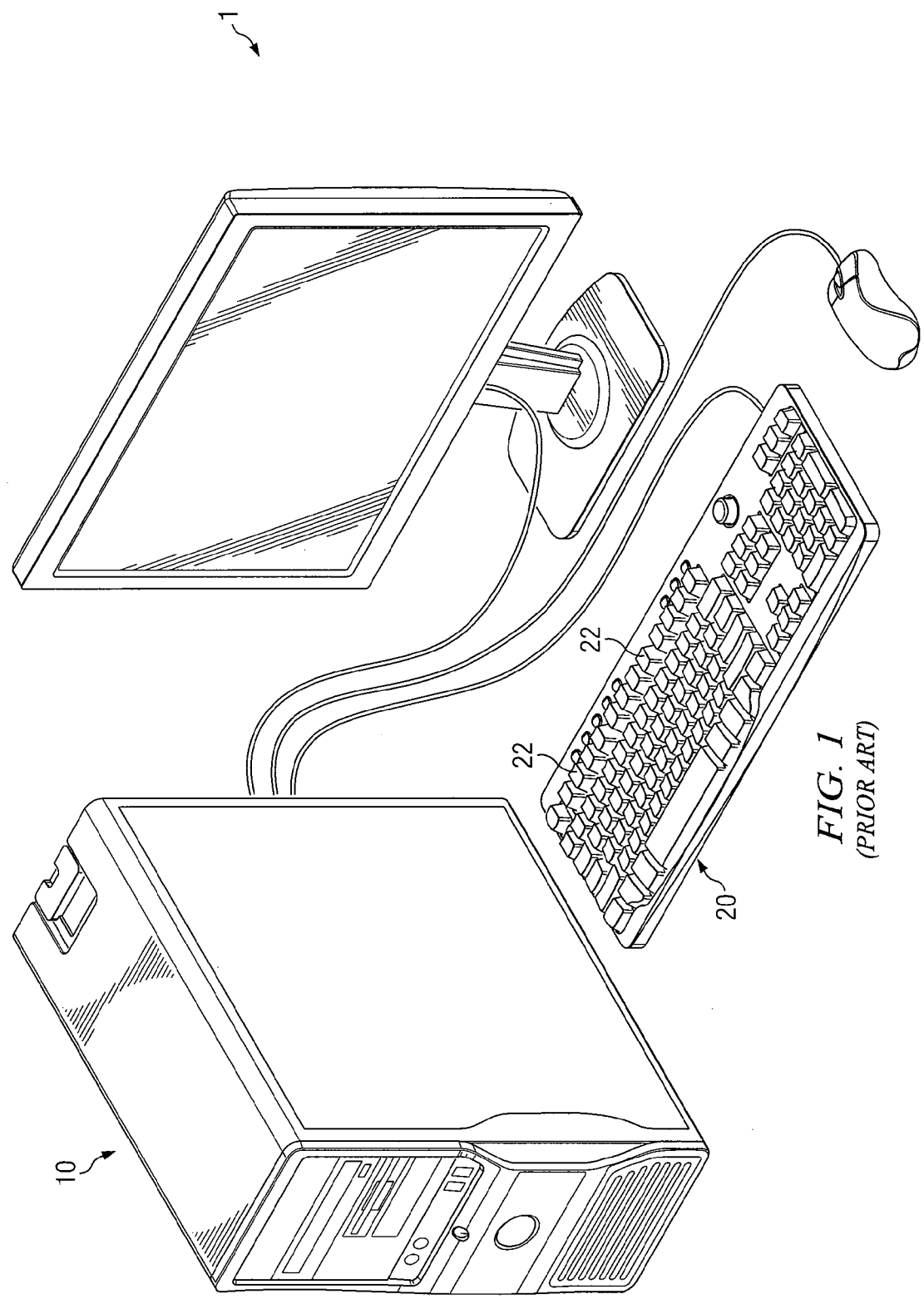
FIG. 1 depicts selected elements of a prior art information handling system.
Figure 2A:
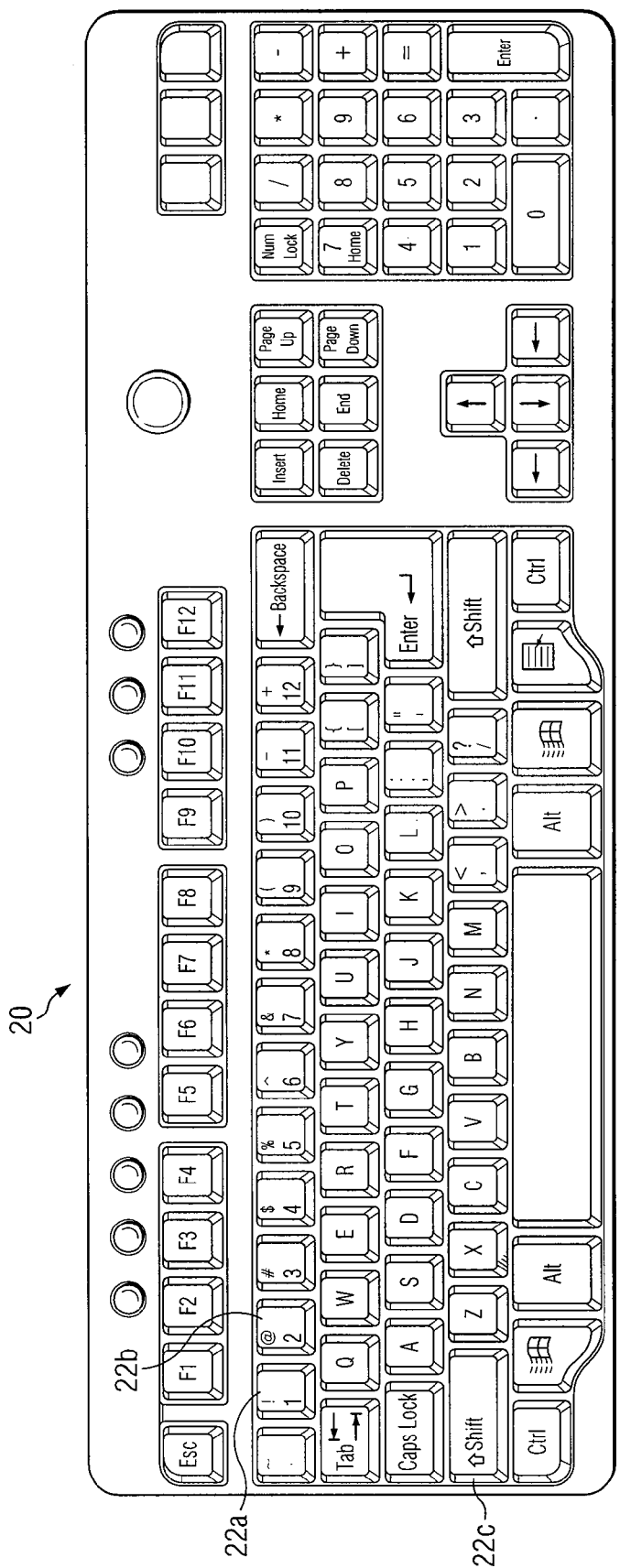
FIG. 2A depicts a prior art keyboard for use with an information handling system.
Figure 2B:
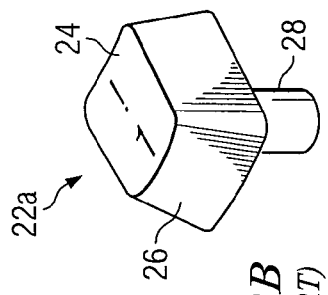
FIG. 2B depicts a prior art key removed from a keyboard.

In some embodiments where finger surface 34 is configured to display two or more different images (e.g., images 46 and 48) as projected from below, the multiple images may be displayed in a spatially coincident manner on finger surface 34. Two images are spatially coincident if they at least partially overlap. For example, first image 46 ("1") at least partially overlaps second image 48 ("!"). In contrast, as shown in FIGS. 1 and 2A-2B, imprinted or embossed keys may present more than one image, but those images will not be spatially coincident and must be reduced in size compared to top surface 24.

Sides 36 of key 32a may be any feature or component of key 32a configured to support finger surface 34. For example, sides 36 may be plain surfaces. In other embodiments, sides 36 may be configured to interact with keyboard 30, e.g., to provide a connection between key 32a and keyboard 30 and/or to transmit a data signal to keyboard 30 when key 32a is depressed.

Post 38 may be any feature or component of key 32a configured to support finger surface 34. For example, post 38 may be a solid cylinder or block. In other embodiments, post 38 may be configured to interact with keyboard 30, e.g., to provide a connection between key 32a and keyboard 30 and/or to transmit a data signal to keyboard 30 when key 32a is depressed.

Figure 5B:
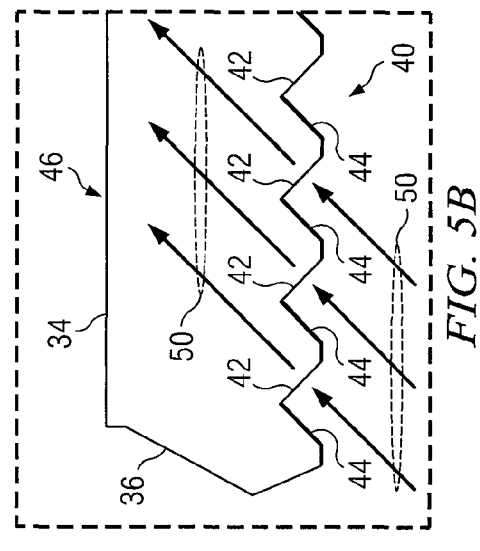
FIG. 5B shows a close-up view of the cross section shown in FIG. 5A.
Figure 5A:
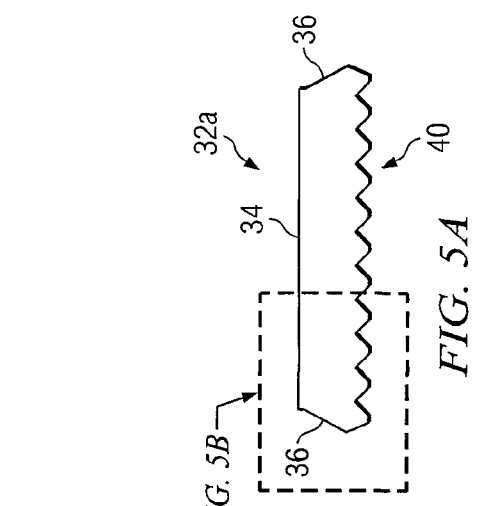
FIG. 5A shows a cross section taken along line 5-5 of the key depicted in FIG. 4.

FIG. 5A shows a cross section taken along line 5-5 of key 32a depicted in FIG. 4. FIG. 5B shows a close-up view of the same cross section shown in FIG. 5A. As shown in FIGS. 5A and 5B, key 32a may include a bottom surface 40. Bottom surface 40 may include one or more lenticular lenses configured to project first image 46 and second image 48 onto finger surface 34. In the embodiment shown in FIGS. 5A and 5B, bottom surface 40 includes a plurality of inverse lenticular lenses. As opposed to traditional lenticular lenses, an inverse lenticular lens presents an image independent of the viewing angle.

A lenticular lens is configured to create a convex perspective of multiple images or light sources. A lenticular lens typically presents two or more images to a viewer dependent on the viewing angle. Some uses of lenticular lenses include a sheet of multiple lenticular lenses aligned to present two or more large images over the surface of the sheet. For example, lenticular lenses may be used to present a dual image of a baseball player on a collectible baseball card. In other examples, lenticular lenses may be used to create several frames of animation, a three dimensional effect, and/or a set of alternate images which may appear to transform into one another. In the case of a lenticular lens, the two or more images may be spatially coincident (e.g., they may be presented in at least partially overlapping positions on the card or other item). Which image is perceived, however, is completely dependent upon the angle at which the lens is viewed. Slight movements of the lenticular lenses, the viewer's head, and/or the viewer's eyes will result in a change of the image seen.

On the other hand, in an inverse lenticular lens, two or more images are located on the facets of the lens. When in use, light is passed through the lens from below and projected onto the surface film. The images on the lens are, therefore, projected from the lens to the surface film. In the case of a key like that shown in FIGS. 5A and 5B, the light is projected through an inverse lenticular lens onto finger surface 34. The light passing through an inverse lenticular lens will project any image located on the lens onto the finger surface. The angle at which the light hits the lenticular lens will determine which set of facets and which image may be projected onto finger surface 34. A user viewing the finger surface of key 32a will see the projected image without regard to the viewing angle. Using these teachings, key 32 may be configured to present two or more spatially coincident images to a user independent of viewing angle. In fact, an individual key 32a may depict many different characters depending on the number of facets on each lenticular lens associated with key 32a.

In the embodiment shown in FIGS. 5A and 5B, a set of lenticular lenses arrayed along bottom surface 40 of key 32a may serve to project two images (e.g., first image 46 and second image 48) onto finger surface 34. When illuminated from below through a first set of facets 42, first image 46 (but not second image 48) may be projected onto finger surface 34. When illuminated from below through a second set of facets 44, second image 48 (but not first image 46) may be projected onto finger surface 34.

FIG. 5B illustrates the display of first image 46 on top surface 34 of key 32a. As shown in FIG. 5B, light incident along each line 50 may pass through first set of facets 42 and intersect with finger surface 34. As long as the light passing through first set of facets 42 can pass through finger surface 34 (e.g., finger surface 34 is transparent to at least one wavelength of the light passing through first set of facets 42), any image present on first set of facets 42 is projected onto finger surface 34. In addition, light passing through second set of facets 44 and intersecting with finger surface 34 will project second image 48 onto finger surface 34.

Using these teachings, key 32a may be configured to present two or more spatially coincident images to a viewer independent of viewing angle. For example, a 16×16 or a 12×12 array of inverted lenticular lenses may be configured to display most useful Japanese kanji characters. Key 32a may be arranged with any suitable source of light controllable to pass through a single set of facets at any given time. Some embodiments useful to provide light from a controlled direction are discussed below with reference to FIGS. 6-8.

As previously discussed, embodiments incorporating teachings of the present disclosure may be used to present multiple character sets to a keyboard user. First image 46 may correspond to a standard "QWERTY" character set. When light passes through first set of facets 42, a standard "QWERTY" character set may be displayed on keyboard 30. Second image 48 may be chosen to correspond to any other desired character set. For example, second image 48 may correspond to a set of "kanji" or Japanese language characters. As additional examples, second image 48 may correspond to characters from foreign alphabets, alternative arrangements of the English language alphabet (e.g., Dvorak keyboards), or characters specific to a program used on an information handling system (e.g., gaming characters or symbols, shortcut commands, etc.).

Figure 6:
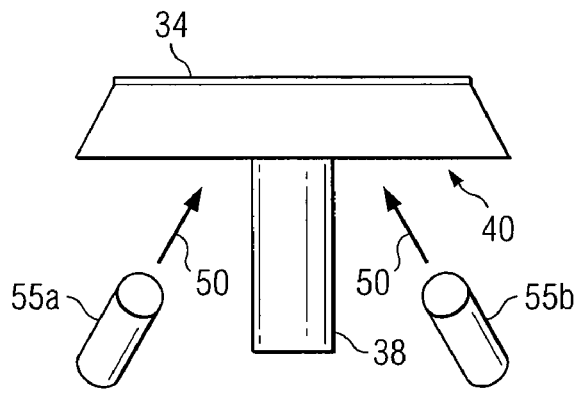
FIGS. 6-8 show embodiments of the key shown in FIG. 4 for use with an information handling system incorporating teachings of the present disclosure.
Figure 7:
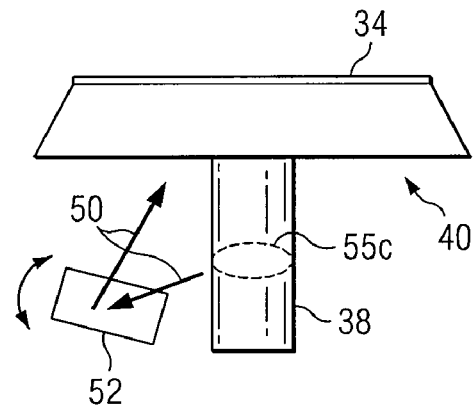
Figure 8:
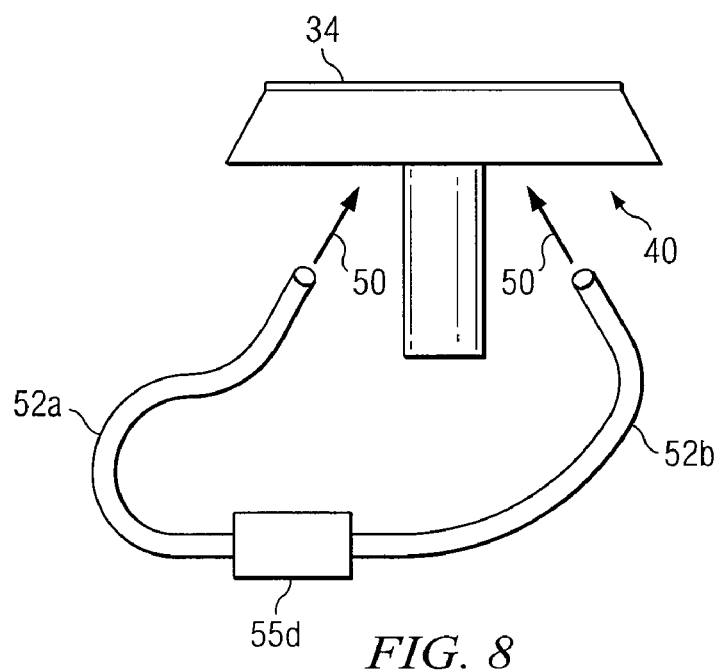

FIGS. 6-8 show embodiments of key 32 for use with an information handling system incorporating the teachings of the present disclosure. In some embodiments, key 32 may be mounted on post 38, as previously discussed. The embodiments shown in FIGS. 6-8 may be suited to mount in association with keyboard 30 and/or with additional character sets (e.g., laptop or notebook computer keyboards, PDA keyboards, and/or any other character set suitable for use with an information handling system). In such embodiments, key 32 may be mounted in association with a light source or emitter 55. Light source 55 may include any device or component configured to provide suitable illumination to the bottom surface of key 32. Suitable illumination may include providing light at a visible wavelength which may be properly transmitted by finger surface 34, providing light incident at an angle selected to project one or more images from the inverted lenticular lens to surface 34, or any other characteristic. In addition, light source 55 may include features or components configured to reduce scattering of the light, e.g., light tubes and/or fiber optic cables.

For example, as shown in FIG. 6, key 32 may be mounted in association with two or more light emitting diodes (LED) 55a and 55b. LED 55a may be configured to provide light incident on bottom surface 40 at a first angle of incidence to project first image 46 from facets 42 of key 32a to finger surface 34. LED 55b may be configured to provide light incident on bottom surface 40 at a second angle of incidence to project second image 48 from facets 44 of key 32a to finger surface 34. LEDs 55a and 55b may be oriented such that the first and second angles of incidence correspond to the angles of facets 42 and 44, respectively. An information handling system may include any components, devices, and/or executable code configured to selectively illuminate LEDs 55a and 55b.

In another example, shown in FIG. 7, key 32 may be mounted in association with one light source 55c and a mirror 52. In this embodiment, mirror 52 may be selectively moved or aimed to reflect light from light source 55c to bottom surface 40 of key 32a at different angles in order to project different images on finger surface 34. As examples, mirror 52 may be mounted to rotate around post 38, to change angle in relation to bottom surface 40, or any other method for reflecting light from light source 55c at more than one angle of incidence to bottom surface 40.

In another example, shown in FIG. 8, key 32 may be mounted in association with light source 55d and two or more cables 52a and 52b. In this embodiment, cables 52a and 52b may be fiber optic cables, light tubes, or any other component or device configured to direct light from light source 55d to bottom surface 40 at more than one angle of incidence in order to project different images on finger surface 34.

Although the disclosed embodiments have been described in detail, it should be understood that various changes, substitutions and alterations can be made to the embodiments without departing from their spirit and scope. For instance, key 32 may have any physical appearance or arrangement configured to interact with keyboard 30 or any information handling system, such as the display and/or controls of a motor vehicle and/or a large information display (e.g., a stock ticker, universal remotes for stereo systems or televisions, an arrival/departure board at an airport, bus terminal or train station, etc.).

What is claimed is:

1. A key for an information handling system, the key comprising:
   a finger surface configured for interaction with a user's finger, the finger surface substantially transparent to at least one wavelength of visible light;
   a lenticular lens positioned beneath the finger surface, the lenticular lens including a first image disposed on a first face of the lenticular lens and a second image disposed on a second face of the lenticular lens;
   the finger surface substantially coextensive with a third face of the lenticular lens;
   wherein light incident on the first face of the lenticular lens at a first angle of incidence projects the first image, a keyboard character, from the first face of the lenticular lens through the third face of the lenticular lens onto the substantially transparent finger surface of the key; and
   wherein light incident on the second face of the lenticular lens at a second angle of incidence projects the second image, different from the first image, from the second face of the lenticular lens through the third face of the lenticular lens onto the substantially transparent finger surface of the key.

2. The key of claim 1, wherein the first image and the second image are spatially coincident on the substantially transparent finger surface of the key when projected from the lens.

3. The key of claim 1, wherein the first image on the lenticular lens corresponds to a standard keyboard character.

4. The key of claim 1, wherein the lenticular lens includes a third image.

5. The key of claim 1, wherein the first image on the lenticular lens corresponds to a character of a non-English language.

6. The key of claim 1, wherein the first image on the lenticular lens corresponds to a command for use in software embodied in computer readable media.

7. A keyboard for an information handling system, the keyboard comprising: at least two keys, each key comprising:
   a finger surface configured for interaction with a user's finger, the finger surface substantially transparent to at least one wavelength of visible light;
   an lenticular lens positioned beneath the finger surface, the lenticular lens including a first image disposed on a first face of the lenticular lens and a second image disposed on a second face of the lenticular lens;
   the finger surface substantially coextensive with a third face of the lenticular lens;
   wherein light incident on the first face of the lenticular lens at a first angle of incidence projects the first image, a keyboard character, from the lens from the first face of the lenticular lens through the third face of the lenticular lens onto the substantially transparent finger surface of the key; and
   wherein light incident on the second face of the lenticular lens at a second angle of incidence projects the second image, different from the first image, from the second face of the lenticular lens through the third face of the lenticular lens onto the substantially transparent finger surface of the key.

8. The keyboard of claim 7, further comprising a key including a finger surface substantially opaque to all wavelengths of visible light.

9. The keyboard of claim 7, wherein the first image and the second image of each key are spatially coincident on the substantially transparent finger surface of the respective key.

10. The keyboard of claim 7, wherein the first image of each key corresponds to a standard keyboard character.

11. The keyboard of claim 7, wherein the lenticular lens of each key includes a third image.

12. The keyboard of claim 7, further comprising:
    a first light emitting diode configured to illuminate the lenticular lens from the first angle of incidence; and
    a second light emitting diode configured to illuminate the inverted lenticular lens from the second angle of incidence.

13. The keyboard of claim 7, further comprising:
    an emitter;
    a first fiber optic cable configured to transmit light from the emitter to the lenticular lens of one or more keys at the first angle of incidence; and
    a second fiber optic cable configured to transmit light from the emitter to the lenticular lens of the one or more keys at the second angle of incidence.

14. The keyboard of claim 7, further comprising:
an emitter; and
a mirror, the mirror rotatably mounted between a first position and a second position, wherein the first position reflects light from the emitter to the lenticular lens of one or more keys at the first angle of incidence and the second position reflects light from the emitter to the lenticular lens of the one or more keys at the second angle of incidence.

15. A method for displaying two or more spatially coincident images on a key associated with an information handling system, the key including a finger surface, the bottom surface of the key including a lenticular lens having an associated first image and an associated second image, and the finger surface of the key being substantially transparent to at least one wavelength of visible light, the method comprising:
  illuminating the bottom surface of the lenticular lens at a first angle of incidence such that the first image, a keyboard character, is projected from the bottom surface of the lenticular lens and displayed on the finger surface of the key; and
  illuminating the bottom surface of the lenticular lens at a second angle of incidence such that the second image, different from the first image, is projected from the bottom surface of the lenticular lens and displayed on the finger surface of the key.

16. The method of claim 15, wherein illuminating the lenticular lens at a first angle of incidence includes using a light emitting diode.

17. The method of claim 15, wherein:
illuminating the lenticular lens at a first angle of incidence includes using a first light emitting diode; and
illuminating the lenticular lens at a second angle of incidence includes using a second light emitting diode.

18. The method of claim 15, wherein:
illuminating the lenticular lens at a first angle of incidence includes transmitting light from an emitter through a fiber optic cable.

19. The method of claim 15, wherein:
illuminating the lenticular lens at a first angle of incidence includes transmitting light from an emitter through a first fiber optic cable; and
illuminating the lenticular lens at a second angle of incidence includes transmitting light from the emitter through a second fiber optic cable.

20. The method of claim 15, wherein:
illuminating the lenticular lens at a first angle of incidence includes reflecting light from an emitter using a mirror in a first position,
illuminating the lenticular lens at a second angle of incidence includes reflecting light from the emitter using a mirror in a second position; and
wherein the mirror is rotatably mounted between the first position and the second position, wherein the first position reflects light from the emitter to the inverted lenticular lens at the first angle of incidence and the second position reflects light from the emitter to the inverted lenticular lens at the second angle of incidence.

* * * * *